United States Patent [19]

Atherton

[11] 4,394,405
[45] Jul. 19, 1983

[54] METHOD OF MAKING FORCE TRANSDUCER FLEXURE

[75] Inventor: Kim W. Atherton, Bellevue, Wash.

[73] Assignee: Sundstrand Data Control, Inc., Redmond, Wash.

[21] Appl. No.: 283,130

[22] Filed: Jul. 14, 1981

[51] Int. Cl.³ .............................................. B05D 5/12
[52] U.S. Cl. ..................................... 427/58; 156/626; 156/644; 156/659.1; 156/661.1; 156/663
[58] Field of Search ...................... 156/626, 644, 659.1, 156/661.1, 663; 427/58; 73/517 B

[56] References Cited

U.S. PATENT DOCUMENTS

| | | | |
|---|---|---|---|
| 3,702,073 | 11/1972 | Jacobs | 73/517 B |
| 3,912,563 | 10/1975 | Tamioka et al. | 156/644 |
| 4,021,276 | 5/1977 | Cho et al. | 156/644 |
| 4,105,493 | 8/1978 | Chauvy | 156/644 |
| 4,139,434 | 2/1979 | Dugan | 156/644 |
| 4,182,187 | 1/1980 | Hanson | 73/517 B |
| 4,250,757 | 2/1981 | Hanson | 73/517 B |
| 4,284,468 | 8/1981 | Stearns | 156/644 |

OTHER PUBLICATIONS

Vossen et al., *Thin Film Processes,* pp. 498, 548, Academic Press, N.Y. 1978.

*Primary Examiner*—Norman Morgenstern
*Assistant Examiner*—Richard Bueker
*Attorney, Agent, or Firm*—Wood, Dalton, Phillips, Mason & Rowe

[57] ABSTRACT

The necessity for rigorously controlling process variables or making physical measurements is eliminated in a method of manufacturing a flexure for use in connecting a force sensing element to a mounting base in a force transducer where indicator portions are provided in a blank and material is removed uniformly from the blank including indicator portions until the indicator portions disappear. This process can also be used to configure a flexure out of a unitary piece of material such as fused quartz where a blank is masked except for indicator portions on each surface of the blank and at least one other surface portion; material is removed from the non-masked portions of the blank; and after removing the mask, material is removed from the blank until the indicator portions disappear.

32 Claims, 5 Drawing Figures

METHOD OF MAKING FORCE TRANSDUCER FLEXURE

BACKGROUND OF THE INVENTION

This invention relates to the manufacture of flexures used in force transducers and more particularly to the method of manufacturing force transducer flexures configured out of a unitary piece of material such as fused quartz.

In a force transducer, for example, an electromagnetic servo balanced accelerometer, the force sensor may include a unitary, fused quartz, glass or metal part consisting of a movable element joined by a bendable flexure section to a base.

An example of such a transducer is found in Jacobs U.S. Pat. No. 3,702,073 and Hanson U.S. Pat. Nos. 4,182,187 and 4,250,757. Copending Hanson application, Ser. No. 283,340, filed July 14, 1981 and assigned to the assignee of this application, discloses flexures for a force transducer with conductors deposited on surfaces substantially in the neutral bending plane of the flexure. This application is concerned with a method for manufacturing such flexure.

In the manufacture of such a transducer, it is desirable to control the flexure thickness dimensions to a high accuracy, since this to a large extent controls the ultimate bias performance of the transducer and it is also considered desirable to achieve this accuracy in a simple, reliable manner. Heretofore, the manufacture of such flexure has required rigorous process controls combined with periodic measurement of the thickness of the flexure.

SUMMARY OF THE INVENTION

The present invention achieves this desirable combination of flexure processing characteristics through utilization of a specially adapted process element, namely an indicator surface.

One feature of the invention is that the method of forming the force transducer flexure section includes the steps of providing a transducer reed blank having a section suitable for flexure fabrication preferably with parallel faces generally at right angles to the sensitive axis of the movable element of the transducer, and removing material from at least one indicator portion of one face to a desired depth.

An indicator surface is a surface produced on an indicator portion of the transducer reed blank from which the flexures are formed. The purpose of the indicator surface is to provide an indicating reference plane which bears a known relation to the planes of surfaces produced on other portions of the blank.

Another feature of the invention is that material may be removed from at least one other portion of at least one face of the flexure section simultaneously with or in a manner substantially identical with removal of material from the indicator portion. Portions fabricated from the face of the transducer reed blank used for the indicator portion will have surfaces substantially coplanar with the indicator surface. Portions fabricated from the opposite face of the reed blank will have surfaces which bear substantially the same respective relation to the face from which they were fabricated, as the indicator surface bears to the face from which it was fabricated.

Another feature of the invention is that indicator portions may be fabricated from opposing surfaces of the transducer reed blank such that they are substantially or partially aligned.

If the indicator portion is processed in a manner substantially identical to the processing of another portion on the same face of the blank as the indicator portion then the relation between the planes of the surfaces produced will remain substantially constant. In this way a predetermined relation between the planes can be maintained. A special case is that surfaces coplanar prior to a processing step will remain substantially coplanar following the step.

If the indicator portion is processed in a manner substantially dissimilar to the processing of other portions of the blank then an adjustment of the relation between planes of the surfaces produced will occur. In this way, a predetermined relation between the planes can be established or adjusted.

A further advantage of the method is that detection of the desired flexure thickness dimensions and the desired flexure compliance may be determined from the part itself during processing by proper fabrication of the indicator portions and subsequent observation of the indicator surfaces, terminating processing as portions of the indicator surface breakthrough and disappear. Such a method produces the proper dimensions to a high accuracy in a manner that is substantially insensitive to inevitable process variations and does not require that the moveable element of a unitary transducer reed be free, and thereby increase the vulnerability of the flexures to damage, in order to accurately achieve the desired flexure compliance.

A further feature of the invention is that it may include the step of observing or otherwise detecting when the indicator areas break through and thereafter terminating removal of material from the flexure section.

A further feature of the invention is that the indicator portions, indicator surfaces and other portions with surfaces coplanar to the indicator surfaces may be processed such that when the indicator surfaces break through, the indicator surfaces and surfaces coplanar to them coincide substantially with the neutral bending plane of the flexure section. This feature makes the process uniquely well suited to fabrication of the flexures described in the copending patent application, Ser. No. 283,340 filed July 14, 1981.

It is a particular and unique advantage of the indicator surface processing described herein, that coplanarity of surfaces of flexure portions which have been fabricated from opposing surfaces of the blank can be easily determined to a high accuracy by simple observation of the blank itself during processing. This is accomplished by using opposing, aligned indicator portions and detecting coplanarity of oppositely facing surfaces by the disappearance of the indicator surfaces as they meet during the material removal process. This capability of the process eliminates the need for rigorous process controls or measurements of the part, which would otherwise be required to obtain similar dimensional tolerances for such a flexure configuration.

A further advantage is that transparent or opaque transducer reed blanks may be used interchangeably with the process.

DETAILED DESCRIPTION OF THE INVENTION

Figure 1:
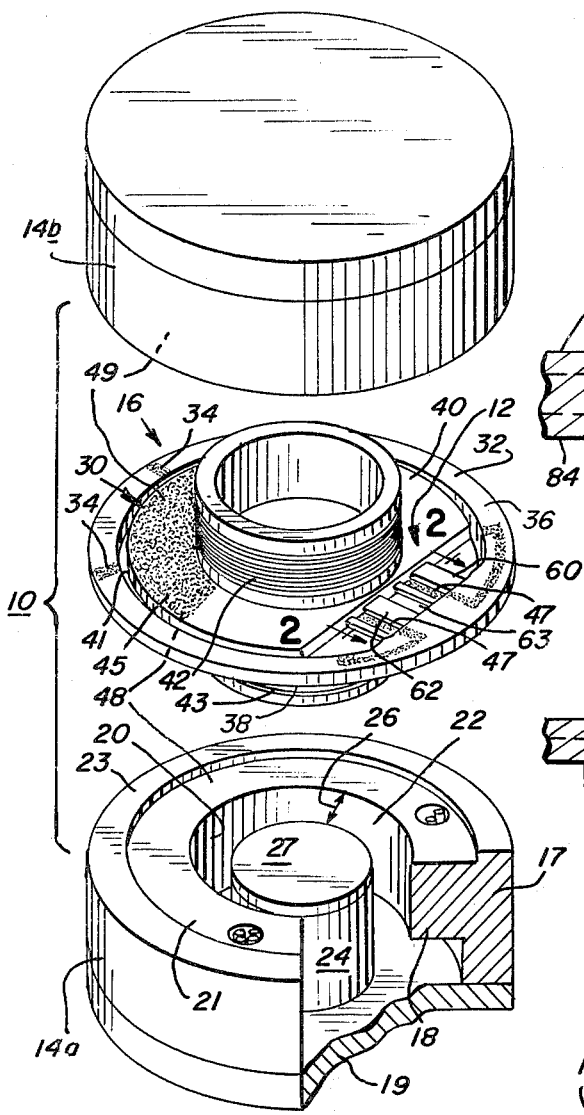
FIG. 1 is an exploded perspective of a servoed accelerometer showing a force transducer with flexures formed in accordance with the invention.

Referring to FIG. 1, there is illustrated a force transducer in the form of a servoed accelerometer 10 which includes a flexure 12 of a type which can be manufactured according to the present invention. The accelerometer 10 is of the type disclosed in Jacobs U.S. Pat. No. 3,702,073 and Hanson U.S. Pat. Nos. 4,182,187 and 4,250,757 although the invention would apply to the fabrication of flexures and other compliant elements used in other force transducers utilizing angular or linear motion of a force sensitive element as well.

The accelerometer 10 consists of a pair of cylindrical body members 14a, 14b and a proof mass assembly 16 secured therebetween.

The body members 14a, 14b are substantially identical and only the body member 14a will be described in detail. The body member 14a includes a cylindrical body wall 17 having an inwardly extending rib 18 constituting a magnetic pole piece and includes a base portion 19. The pole piece 18 has a cylindrical inner wall 20 defining a recess 22. Secured to the base portion 19 within the recess 22 is cylindrical permanent magnet 24 which has an outer circumferential surface spaced from the inner cylindrical wall 20 to define an annular gap 26 therebetween.

The proof mass assembly 16 includes a force sensitive member or paddle 30 which is hingedly mounted by means of the flexure 12 to a mounting base or ring 32.

In the accelerometer shown in the figures, the flexure 12 allows the paddle 30 to move relative to the mounting ring 32. However, it should be understood that the flexure 12 could be combined with different mounting means and used in a transducer utilizing linear motion of the sensing element along the axis of the transducer 10.

Secured to upper and lower faces 40, 41 of the paddle 30 are a pair of force restoring, or torquer coils 42, 43, respectively. The torquer coils 42, 43 are wound on bobbins which fit within the annular gap 26 formed in each of the body members 14a, 14b when the various parts of the accelerometer 10 are assembled.

Deposited on the upper face 40 of the paddle 30 is a layer of conductive material 45. A similar layer of conductive material is deposited on the lower face 41 of the paddle 30. These electrically conductive layers form a pair of capacitor plates which interact with a face 21 of the pole piece 18 and a corresponding face of the pole piece of body member 14b, in a manner to be hereinafter described.

Three mounting pads 34 (one of which is not shown in the figures) are disposed on an upper surface 36 of the mounting ring 32. Three additional mounting pads are located axially opposite the mounting pads 34 on a lower surface 38 of the ring 32.

The mounting ring 32 is secured between the body members 14a, 14b such that a lip 23 of the cylindrical body wall 17 and a corresponding lip on the body member 14b bear against the mounting pads, and the torquer coils 42, 43 are received within the annular gap 26 and a corresponding annular gap in the body member 14b, respectively.

A pair of variable capacitors 48, 49 are formed within the accelerometer 10, one of which consists of the face 21 and the coating on the lower surface 38, and the other of which consists of a face corresponding to the face 21 of the pole piece of the body member 14b and the coating 45 on the upper surface 36 of the flapper 30.

The conductive layers on the upper face 40 and the lower face 41 and the torquer coils 42, 43 are coupled to external circuitry by means of four conductive strips 47 which extend to the ring 32 across the flexure 12. Electrical connections to external circuitry are made from the ring 32 through four connector pins (not shown) located in the body walls of the members 14a, 14b.

When the accelerometer 10 is subjected to acceleration along its axis, the paddle 30 moves relative to the ring 32 and the body members 14a, 14b, in turn causing a change in the capacity of the capacitors 48, 49. The change in capacity is detected by a servo-loop circuit (not shown), which in turn couples a signal proportional to the change in capacity to the torquer coils 42, 43. The resulting magnetic field set up by the torquer coils 42, 43 interacts with the magnetic field established by the permanent magnets in the body members 14a, 14b, to oppose the displacement of the paddle 30. The current required by the torquer coils 42, 43 to maintain the paddle 30 in a neutral position represents the acceleration force to which the accelerometer is subjected.

For a further description of the accelerometer 10, reference should be made to Jacobs U.S. Pat. No. 3,702,073, the disclosure of which is incorporated herein.

Figure 2:
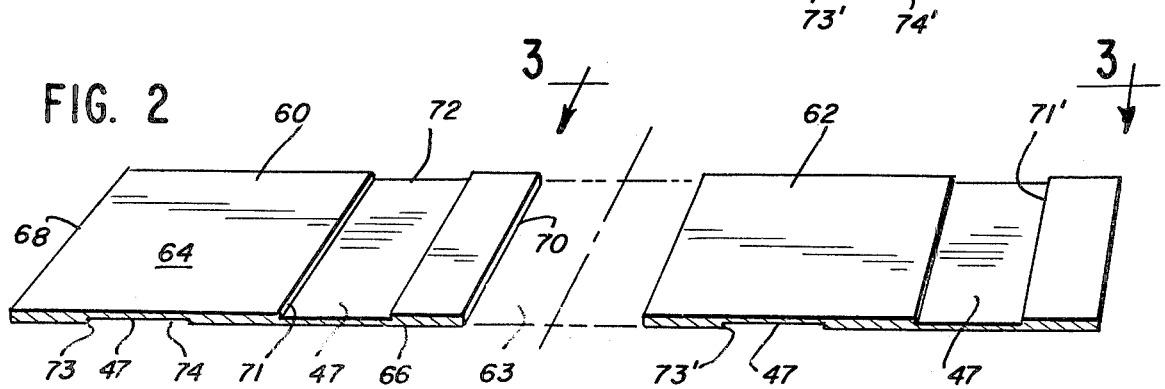
FIG. 2 is an enlarged fragmentary perspective of the flexure section taken along line 2—2 of FIG. 1.

Referring now to FIG. 2, an embodiment of the flexure 12 which could be fabricated by the present invention is illustrated.

The flexure has a bifilar cantilever configuration consisting of a pair of flexure sections 60, 62 which extend between the paddle 30 and the mounting ring 32. The sections 60 and 62 are separated by an intervening aperture 63 which also extends between the paddle 30 and the mounting base 32.

The flexure sections 60 and 62 are identical and hence only the section 60 will be described.

The section 60 includes upper and lower faces 64 and 66 which are substantially parallel to each other, and a pair of edges 68, 70.

The flexure section 60 has a pair of channels 71, 73 extending into the section 60 from the faces 64, 66, respectively. The channels 71, 73 have recessed surfaces 72, 74, respectively, which are substantially coplanar with each other and with the centroid of the flexure cross-section, and substantially coincident with the neutral bending plane of the body portion 60.

The "neutral bending plane" is defined as that plane which does not experience tension or compression when the flexure is curved in simple bending. For a flexure having a uniform rectangular cross-sectional configuration formed by two parallel faces and two edges such as that shown in FIG. 2, the neutral bending plane consists of all points which are equidistant from the faces of the flexure, i.e., the plane located midway between the faces of the flexure. For the embodiment of the flexure shown in FIG. 2, the principal plane, and hence the neutral bending plane of the flexure is slightly rotated with respect to plane of 71, 72, 73 and 74, but the discrepancy is minimal and does not substantially impact the utility of the invention disclosed herein.

The paddle 30, mounting base 32 and flexure 12 are preferably a unitary element of a stable homogeneous material such as fused quartz. A circular blank of uniform thickness with parallel plane faces is processed by the selective removal of material to achieve the desired configuration. The following discussion is concerned particularly with the preferred process used to form the flexure channels 71, 73 with surfaces 72, 74 substantially in the neutral bending plane of the flexure.

Preferably the material is removed from the blank by etching with a suitable quartz solvent. The quartz blank has those surfaces where material is not to be removed masked with a material which restricts access of the solvent to the quartz surface. The masked blank is then immersed in the solvent. In a matter of minutes, several thousandths of an inch of the quartz material is etched away, the exact rate depending on the composition of the quartz, the concentration of the solvent and the temperature of the bath. Alternatively, material may be removed from the blank by gas plasma etching in an atmosphere which will dissolve quartz or by electron or ion beam milling.

Figure 3:
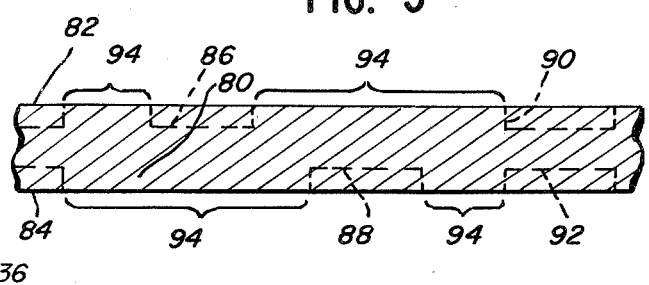
FIGS. 3, 4 and 5 are fragmentary sectional views taken as indicated by line 3—3 of FIG. 2, through a portion of a transducer blank in which the flexure is formed, illustrating successive stages in the manufacture of the flexure.
Figure 5:
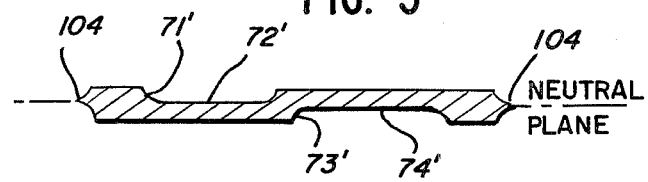

FIG. 3 is a transverse section through the portion of a quartz blank 80 from which one half 62 of the bifilar flexure 12 is formed. The blank 80 may have parallel planar surfaces 82, 84 and for the purposes of this example has a thickness of the order of 0.03 inch. Dashed lines 86, 88 identify material to be removed in the first stage of the processing, forming the oppositely oriented, laterally offset channels which become 71', 73' as shown in FIG. 5. Dashed lines 90, 92 identify material removed simultaneously in the first stage of the processing, forming a pair of opposed areas which serve throughout the process as indicators of the planes of the associated recessed surfaces which are to become 72' and 74' in FIG. 5.

The surface indicated by brackets 94 is not to have material removed in the first stage of the processing and are masked as described above.

Figure 4:
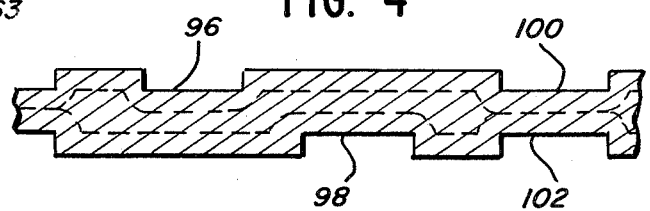

The blank 88 is immersed in the solvent for a period of time sufficient to form intermediate channels 96, 98 and intermediate indicator surfaces 100, 102, FIG. 4 which are of a depth substantially one-half the finally intended total flexure thickness. The partially dashed lines in FIG. 4 indicate the final outline of the flexure and its relationship to the surfaces produced by the first etching stage.

The coating of masking material is removed from the surfaces 94 and the blank is returned to the solvent medium. Material is then removed from all the surfaces of the flexure at a uniform rate. As material removal proceeds at the same rate from both the upper and lower surfaces of the flexure, the indicator surfaces 100, 102 meet and disappear, at the plane which is equidistant from the original surfaces of the blank, i.e., substantially coincident with the neutral bending plane of the flexure. At the same time, an equal depth of material has been removed to form channels 71', 73' so that the bottom surfaces 72', 74' of the channels are coplanar with each other and with the flexure cross-section centroid and substantially coincide with the neutral bending plane of the flexure.

The disappearance of the web of quartz material between indicator surfaces 100, 102 is detected. When this occurs, the blank is removed from the etching bath and removal of material stopped. This procedure typically achieves coplanarity of the surfaces 72' and 74' substantially in the neutral bending plane of the flexure accurately regardless of process variations and without the need for rigorous physical measurements of the thickness of the flexure.

The blank is washed to remove any remaining solvent and is then ready for further processing to achieve the desired configuration of the quartz piece for the proof mass assembly 16. Subsequently, a suitable conductor 47 is applied to surfaces 72', 74' as by vacuum deposition or sputtering.

If the etching process is not terminated precisely on break through of indicator surfaces 100, 102, channels 71', 73' will be deeper or shallower and surfaces 72', 74' spaced on opposite sides of the neutral plane and the flexure thickness will vary slightly from its intended dimension. However, the spacing of these surfaces from the neutral plane, and the flexure thickness discrepancy, will be small as compared with the flexure thickness, which may be of the order of 0.001 inch in this example, and such errors will not significantly reduce the utility or effectiveness of the process.

This process can also be used to manufacture flexures of a predetermined thickness by first removing material from an indicator surface to form a recess of a predetermined depth and then removing material from a flexure region at the same time as material is removed from the recessed indicator surface. When the single indicator surface breaks through, a flexure of predetermined thickness will result.

We claim:

1. A method of manufacturing a flexure for use in connecting a force sensing element to a mounting base in a force transducer comprising:
   providing a blank with two opposed surfaces;
   removing material from a first portion and a first indicator portion of one of said surfaces;
   removing material from a second indicator portion in the other of said surfaces wherein at least a portion of said indicator portion is directly opposite from said first indicator portion; and
   discontinuing removal of material from said first portion when at least a portion of the material of said blank between said first and second indicator portions disappears such that at least a portion of said indicator portion surfaces meet.

2. The method of claim 1 wherein the material from said first portion, and said first indicator portion and said second indicator portion is removed in a substantially identical manner.

3. The method of claim 1 wherein said other surface includes a second portion and including removal of material from said second portion in a substantially identical manner as said first portion.

4. The method of claim 3 wherein said second portion is not directly opposite said first portion.

5. The method of claim 1 or 2 wherein the surface of said first portion is substantially coincident with the neutral bending plane of the flexure when the removal of material is discontinued.

6. The method of claim 3 or 4 wherein the surfaces of said first and said second portions are substantially coincident with the neutral bending plane of the flexure when the removal of material is discontinued.

7. The method of claim 1, 2, 3 or 4 wherein said material is removed by etching.

8. A method of manufacturing a flexure for use in connecting a force sensing element to a mounting base in a force transducer comprising:
   providing a blank with two opposed surfaces;

masking said blank except for opposed indicator portions on each of said surfaces and at least one surface portion;
removing a predetermined amount of material from the non-masked portions of said blank;
removing said mask from said blank;
continuing removal of the material from a flexure section of said blank; and terminating removal of material from said flexure section of said blank when at least a portion of the material between said first and second indicator portions disappears such that at least a portion of said indicator portions meet.

9. The method of claim 8 wherein said masking step additionally includes masking a second surface portion in the blank surface opposing the surface that includes the first surface portion and wherein said first and second surface portions are not directly opposite one another.

10. The method of claim 9 wherein said material is removed such that the surfaces of said first and second surface portions are in the same plane when said removal of said material is terminated.

11. The method of claim 9 wherein said surfaces of said first and second surface portions are substantially coincident with the neutral bending plane of the flexure when said removal of said material is terminated.

12. In the manufacture of a force transducer having a movable element hinged to a base by a bendable flexure, the movable element having an electrical circuit component thereon, the improved method of forming the flexure section, comprising:
providing a transducer blank having a flexure section with parallel faces generally at right angles to the sensitive axis of the movable element; and
removing material from a portion of at least one face of said flexure section to form a conductor receiving channel, the bottom surface of such channel lying substantially in the neutral bending plane of said flexure section.

13. The flexure forming method of claim 12 in which material is removed from portions of each face of the flexure section at the same time and at the same rate to form a pair of oppositely facing conductor receiving channels, each having a bottom surface lying substantially in the neutral bending plane of said flexure section.

14. The flexure forming method of claim 12 including:
removing material from an opposed pair of indicator areas on each face of said blank, simultaneously with and at the same rate material is removed from the face of said flexure section; and
terminating removal of material from the face of said flexure section when the opposed indicator areas break through.

15. The flexure forming method of claim 14 including the step of detecting when the opposed indicator areas break through and thereafter terminating removal of material from said flexure section.

16. The flexure forming method of claim 12 wherein said channels are laterally spaced apart.

17. The flexure forming method of claim 12 wherein said channels extend the length of the flexure section from the base to the movable element.

18. The flexure forming method of claim 12 including the step of applying a conductor on the bottom surface of each of said channels and extending from said base to said movable element.

19. In the manufacture of a force transducer having a movable element hinged to a base by a bendable flexure, the movable element having an electrical circuit component thereon, the improved method of forming the flexure section, comprising:
providing a transducer blank having a flexure section with parallel faces extending from said base to said movable element, said parallel faces being generally at right angles to the sensitive axis of the movable element;
removing material from a portion of at least one face of said flexure section to form a conductor receiving channel;
removing material from a pair of opposed indicator areas on each face of said blank, simultaneously with and at the same rate material is removed from said channel of said flexure section; and
terminating removal of material from the face of said flexure section when the opposed indicator areas break through, the bottom surface of said channel lying substantially in the neutral bending plane of said flexure section.

20. In the manufacture of a force transducer having a movable element hinged to a base by a bendable flexure, the movable element having an electrical circuit component thereon, the improved method of forming the flexure section, comprising:
providing a transducer blank of a fused quartz material, having a flexure section with parallel faces generally at right angles to the sensitive axis of the movable element;
removing material from a portion of each face of said flexure section to form a pair of oppositely facing conductor receiving channels;
removing material from a pair of opposed indicator areas on each face of said blank, simultaneously with and at the same rate material is removed from said channels of said flexure section; and
terminating removal of material from said channels of said flexure section when the opposed indicator areas break through, the bottom surface of each channel lying substantially in the neutral bending plane of said flexure section.

21. The flexure forming method of claim 20 in which the material is removed from said blank by etching.

22. The flexure forming method of claim 21 in which the material is removed from said blank by acid etching.

23. The flexure forming method of claim 21 in which the material is removed from said blank by plasma etching.

24. The flexure forming method of claim 21 in which the material is removed from said blank by ion beam milling.

25. A method of manufacturing a flexure for use in connecting a force sensing element to a mounting base in a force transducer comprising:
providing a transducer blank with two opposed surfaces;
removing material from a first indicator portion of one of said surfaces to provide an indicator surface with a predetermined recess depth;
removing additional material from said indicator portion and at least one other portion of at least one of said surfaces to form a flexure region on said blank; and discontinuing removal of material from the flexure region when at least a portion of said indicator surface breaks through and disappears.

26. The method of claim 25 wherein material is removed from a second indicator portion in the other of said opposed surfaces.

27. The method of claim 26 wherein said first and second indicator portions are at least partially directly opposed such that they may mutually meet and break through at a portion of their indicator surfaces at some point in processing.

28. The method of claim 27 wherein material is removed from at least one channel portion in one of said opposed surfaces such that the surface of said channel portion remains substantially coplanar with the indicator portion located in the same one of said opposed surfaces.

29. The method of claim 28 wherein the surface of at least one channel portion is substantially coincident with the neutral bending plane of the flexure when the removal of material is discontinued.

30. The method of claim 26, 27 or 28 wherein processing of corresponding portions on opposed surfaces of the blank is substantially identical, resulting in substantial symmetry of the corresponding surface planes with respect to the midplane of the blank.

31. The method of claim 28 or 29 wherein substantially identical processing is achieved through concurrent processing.

32. The method of claim 30 wherein substantially identical processing of the opposed surfaces of the blank is achieved through concurrent processing of the opposed surfaces.

* * * * *